(12) United States Patent
Matsubayashi et al.

(10) Patent No.: US 8,671,547 B2
(45) Date of Patent: Mar. 18, 2014

(54) FASTENING MEMBER AND FASTENING STRUCTURE

(75) Inventors: Kou Matsubayashi, Nagoya (JP); Takushi Miyake, Iwakura (JP)

(73) Assignees: Art Screw Co., Ltd., Nagoya-shi, Aichi (JP); City of Nagoya, Nagoya-shi, Aichi (JP)

(*) Notice: Subject to any disclaimer, the term of this patent is extended or adjusted under 35 U.S.C. 154(b) by 103 days.

(21) Appl. No.: 13/319,675

(22) PCT Filed: Feb. 10, 2011

(86) PCT No.: PCT/JP2011/052877
§ 371 (c)(1),
(2), (4) Date: Nov. 9, 2011

(87) PCT Pub. No.: WO2011/105225
PCT Pub. Date: Sep. 1, 2011

(65) Prior Publication Data
US 2012/0047709 A1    Mar. 1, 2012

(30) Foreign Application Priority Data
Feb. 26, 2010 (JP) ................. 2010-041614

(51) Int. Cl.
*F16B 33/00*   (2006.01)
*F16B 33/02*   (2006.01)
*F16B 39/28*   (2006.01)
*B23P 11/00*   (2006.01)

(52) U.S. Cl.
USPC ............ 29/525.01; 411/366.1; 411/308; 411/366.3; 411/411

(58) Field of Classification Search
USPC ......... 29/525.01; 411/308–311, 411, 366.1, 411/366.3
See application file for complete search history.

(56) References Cited

U.S. PATENT DOCUMENTS 3,323,402 A * 6/1967 Gowen, Jr. et al. ............ 411/411
3,927,503 A * 12/1975 Wilson ........................... 411/311

(Continued)

FOREIGN PATENT DOCUMENTS

CN    101424295         5/2009
DE    103081301 A1      9/2004

(Continued)

OTHER PUBLICATIONS

PCT/JP11/052877, May 10, 2011, International Search Report.

(Continued)

*Primary Examiner* — David Bryant
*Assistant Examiner* — Jun Yoo
(74) *Attorney, Agent, or Firm* — Quarles & Brady LLP; Gavin J. Milczarek-Desai

(57) ABSTRACT

A fastening member that exerts a high loosening-inhibition effect is provided.

A fastening member 1 has an upper portion 11 on a thread top portion side and a lower portion 12 on a thread root side in at least a part of a thread 10. The upper portion 11 and the lower portion 12 have following constructions. A pressure-side flank surface 13 and a play-side flank surface 14 are formed on the upper portion 11. A pressure-side side surface 15 and a play-side side surface 16 are formed on the lower portion 12. The pressure-side side surface 15 is formed to be continuous from a lower end of the pressure-side flank surface 13. In a cross-section including an axial line of the fastening member 1, a shape of the pressure-side side surface 15 is a curve line shape that curves inward from an extended line of the pressure-side flank surface 13 or a shape provided by combining a straight line shape positioned inside the extended line of the pressure-side flank surface 13 and a curve line shape that curves inward from the extended line.

20 Claims, 8 Drawing Sheets

(56) References Cited

U.S. PATENT DOCUMENTS

| | | | | |
|---|---|---|---|---|
| 4,071,067 A | * | 1/1978 | Goldby | 411/307 |
| 4,549,754 A | * | 10/1985 | Saunders et al. | 285/334 |
| 5,127,784 A | * | 7/1992 | Eslinger | 411/414 |
| 5,876,168 A | | 3/1999 | Iwata | |
| 6,467,818 B1 | * | 10/2002 | Snapp et al. | 285/334 |
| 7,416,374 B2 | * | 8/2008 | Breihan et al. | 411/411 |
| 7,731,466 B2 | | 6/2010 | Shea et al. | |
| 2011/0033263 A1 | | 2/2011 | Matsubayashi | |

FOREIGN PATENT DOCUMENTS

| | | |
|---|---|---|
| JP | 48-13902 | 5/1973 |
| JP | A-S59-019712 | 2/1984 |
| JP | S-63-164616 | 10/1988 |
| JP | 3-6115 | 1/1991 |
| JP | 6-87713 A | 12/1994 |
| JP | 3031085 | 11/1996 |
| JP | 9100825 A | 4/1997 |
| JP | A-H09-100825 | 4/1997 |
| JP | 2005061602 A | 3/2005 |
| JP | 2006057801 A | 3/2006 |
| JP | 2008-144955 A | 6/2008 |
| TW | 201033485 | 9/2010 |
| WO | WO8911044 | 5/1989 |
| WO | WO2008/081721 | 7/2008 |
| WO | WO2010/092817 A1 | 8/2010 |

OTHER PUBLICATIONS

Search Report for Taiwan Invention Patent Application No. 100125488 (foreign counterpart).

Supplemental European Search Report for Application No. 10741097.9, Art Screw Co., Ltd. (related application).

* cited by examiner

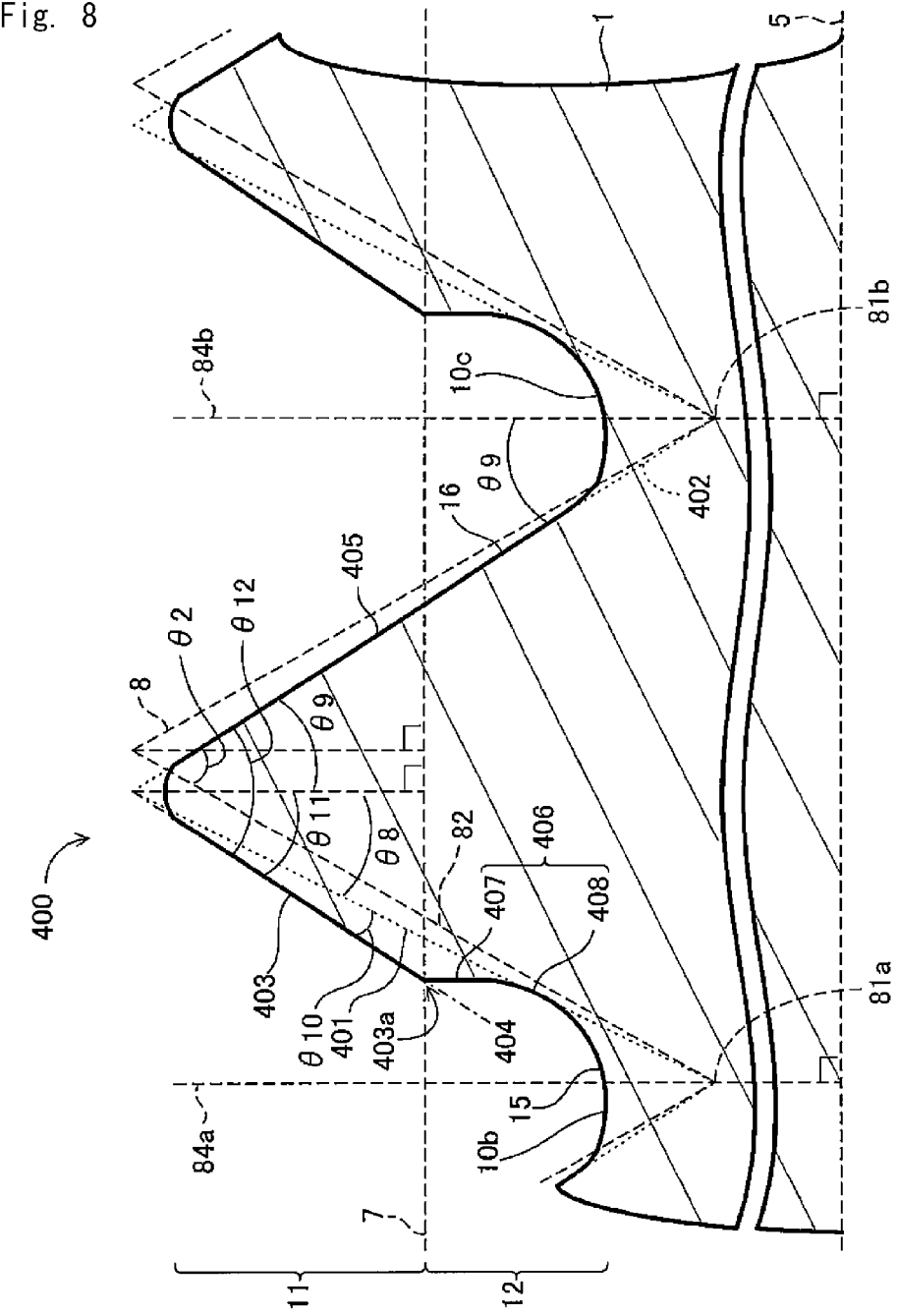

FASTENING MEMBER AND FASTENING STRUCTURE

FIELD OF THE INVENTION

The present invention relates to a fastening member and a fastening structure.

BACKGROUND OF THE INVENTION

Conventionally, fastening members having thread structures such as a bolt and a nut have been used widely. In order to actually enable fastening the bolt to the nut, it is necessary to provide dimensional tolerance in an outer diameter and an effective diameter of the bolt and an inner diameter and an effective diameter of the nut. However, there is a possibility that the tolerance causes loosening. Conventionally, various devices for inhibiting the occurrence of the loosening have been made.

Patent document 1 discloses a tightening screw structured as follows. That is, a flat flank portion on a thread tip end side and a pressure-contact flank portion continuous to the flat flank portion are formed on a pressure-contact flank, which is one of both flanks of a thread of an external screw or an internal screw and which serves as a pressure-contact side in a fastened state. An inclination of the pressure-contact flank portion is formed to be larger than an inclination of a flank of an internal screw or an external screw facing the pressure-contact flank portion.

Patent document 2 discloses an external screw, in which a thread external diameter is formed to be larger than a reference value and a half angle on a top side of the thread is set at an angle smaller than 30 degrees.

There is also a method to inhibit the loosening by forming a resin coating layer on a part of a thread.

Further, Patent documents 3 to 7 may be also referred to as prior literatures disclosing technologies related to the present invention.

PRIOR TECHNICAL LITERATURE

Patent document

Patent document 1: JP-A-2006-57801
Patent document 2: JP-A-H9-100825
Patent document 3: Japanese Utility Model Application Publication No. H6-87713
Patent document 4: JP-A-2005-61602
Patent document 5: Japanese Examined Patent Publication No. S48-13902
Patent document 6: Japanese Utility Model Application Publication No. H3-6115
Patent document 7: Japanese Registered Utility Model No. 3031085

DISCLOSURE OF THE INVENTION

Problems to be Solved by the Invention

According to the technology of Patent document 1, both of the flat flank portion and the pressure-contact flank portion are flat surface shapes. Therefore, when a large fastening force is applied to the screw, stress tends to concentrate in a connection between the flat flank portion and the pressure-contact flank portion. Accordingly, there is a problem that plastic deformation or a crack is apt to arise in the connection.

According to the technology of Patent document 1, a fastening member as a counterpart is fastened to the fastening member having the flat flank portion and the pressure-contact flank portion. A flank angle of a pressure-contact flank (pressure-side flank surface) of the counterpart fastening member is different from a flank angle of the flat flank portion of the fastening member. Therefore, there is a problem that a contact area between the pressure-contact flank portion of the counterpart fastening member and the flat flank portion is small and a large frictional force cannot be obtained, so a sufficient loosening-inhibition effect cannot be exerted.

Patent document 2 describes that, as tightening torque increases gradually and a fastening force increases, the thread of the external screw causes elastic deformation and contacts a root of the internal screw, whereby the contact portion enlarges in series (refer to paragraph 0009).

However, according to the technology of Patent document 2, a flank angle of a pressure-side flank surface of the external screw is different from a flank angle of a pressure-side flank surface of the internal screw. Therefore, although the contact portion enlarges in series as the fastening force increases, a large frictional force cannot be obtained in the contact portion because plastic deformation occurs. As a result, a sufficient loosening-inhibition effect cannot be exerted.

As for the method for inhibiting the loosening by forming the resin coating layer on a part of the thread, it is required to form the resin coating layer again when the screw is reused. In this way, this method is laborious.

In the conventional constructions including Patent documents 1 and 2, so-called "initial loosening" occurs due to collapse of a seat surface. If the initial loosening is left as it is, there is a possibility that an axial force reduces and excessive stress concentration arises in the bolt, thereby causing a break of the bolt. It has been difficult to preclude the occurrence of such the initial loosening. An only countermeasure has been additional tightening.

When hot-dip galvanization is applied to the external screw or the internal screw, in order to prevent the external screw and the internal screw from becoming unable to fit to each other because of thickness of the plating, it is necessary to cut the internal screw more than usual (that is, it is necessary to provide additional tapping).

If such the additional tapping is applied to the conventional constructions including Patent documents 1 and 2, a gap between the flank surface of the external screw and the flank surface of the internal screw enlarges. As a result, the frictional force between the flank surface of the external screw and the flank surface of the internal screw decreases largely or the frictional force cannot be obtained. Therefore, it is quite difficult to apply the thick plating such as the hot-dip galvanization to the conventional constructions while maintaining the loosening-inhibition effect.

The present invention has been made to solve the above-described problems and has at least one of following objects.

(1) To provide a fastening member or a fastening structure that exerts a high loosening-inhibition effect.

(2) To provide a fastening member or a fastening structure that can be fastened like a usual fastening member with easy torque management and can be reused easily.

(3) To provide a fastening member or a fastening structure having fatigue strength improved by relaxing a load applied to a first thread of the fastening member and by inhibiting stress concentration.

(4) To provide a fastening member or a fastening structure that inhibits occurrence of initial loosening.

(5) To provide a fastening member or a fastening structure, to which plating with large thickness can be applied while maintaining the loosening-inhibition effect.

Means for Solving the Problem

The inventors of the present invention studied earnestly to solve the above-described problems. Eventually, the inventors reached following concepts of respective aspects of the present invention.

A first aspect of the present invention is defined as follows.

A fastening member has an upper portion on a thread top portion side and a lower portion on a thread root side in at least a part of a thread. The upper portion and the lower portion have following constructions. That is, a pressure-side flank surface and a play-side flank surface are formed on the upper portion, a pressure-side side surface and a play-side side surface are formed on the lower portion, the pressure-side side surface is formed to be continuous from a lower end of the pressure-side flank surface, and a shape of the pressure-side side surface in a cross-section including an axial line of the fastening member is a curve line shape that curves inward from an extended line of the pressure-side flank surface or a shape provided by combining a straight line shape positioned inside the extended line of the pressure-side flank surface and a curve line shape that curves inward from the extended line.

In the fastening member defined according to the first aspect, the pressure-side side surface of the lower portion of the thread has the specific shape (curve line shape that curves inward from extended line of pressure-side flank surface or shape provided by combining straight line shape positioned inside extended line of pressure-side flank surface and curve line shape that curves inward from extended line in cross-section including axial line of fastening member). If the thread receives a force from a counterpart fastening member due to fastening, the thread is caused to deform to a play side as a whole. The deformation concentrates on the pressure-side side surface and causes elastic deformation therein. In other words, the force from the counterpart fastening member preferentially induces the elastic deformation of the pressure-side side surface. As a result, the thread deforms to the play side as a whole (as elastic deformation of entire thread). If such the pressure-side side surface does not exist, the load applied to the thread concentrates in the thin top portion and deforms the top portion. In this case, there is a possibility that plastic deformation of the top portion is caused.

The thread deforms as a whole, but the deformation originates from the elastic deformation concentrated in the pressure-side side surface having the specific shape. Therefore, the thread causes a large repulsive force to return to the initial shape. Thus, a large reaction force and an eventual large frictional force are caused between the pressure-side flank surface of the fastening member and the pressure-side flank surface of the counterpart fastening member. Thus, the loosening-inhibition effect is surely exerted.

The pressure-side side surface has the specific shape (curve line shape that curves inward from extended line of pressure-side flank surface or shape provided by combining straight line shape positioned inside extended line of pressure-side flank surface and curve line shape that curves inward from extended line in cross-section including axial line of fastening member). Therefore, even if stress concentrates in the pressure-side side surface during the deformation, the pressure-side side surface hardly causes plastic deformation, cracking or the like. It is because the stress acts in a direction to widen and open the curve line portion and disperses widely and equally in the curve line portion.

It is preferable that the above structure is applied to all the successive threads. Alternatively, the above structure may be applied to only a portion screwed with the counterpart fastening member.

If the above-described shape of the side surface is provided also on the play side of the thread, the lower portion of the thread becomes thin and the thread becomes more apt to cause elastic deformation as a whole. However, in this case, there is a higher possibility that an elastic force is lost with elapse of time and plastic deformation of the entire thread arises than in the case where the elastic deformation is concentrated in the pressure-side side surface as in the present invention.

When the fastening member of the prior art is screwed to the counterpart fastening member, the largest load is applied to the first thread.

As contrasted thereto, since the first thread causes the elastic deformation in the fastening member defined according to the first aspect, the force applied to the first thread disperses to the second thread. Further, since the second thread is also capable of causing the elastic deformation, the force applied to the second thread disperses to the third thread. Such the dispersion of the force continues in the third thread, the fourth thread and so on. Thus, the force from the counterpart fastening member is received by the many threads.

Thus, the load applied to the first thread is dispersed and the stress concentration to the root of the first thread can be inhibited. Thus, fatigue strength improves and a break of the screw can be inhibited. Moreover, repetitive use of the fastening member is ensured.

Even when additional tapping is provided to the fastening member, the pressure-side flank surface of the fastening member necessarily contacts the pressure-side flank surface of the counterpart fastening member since the pitch is the same. Accordingly, the thread causes a sufficient reaction force between the pressure-side flank surface of the fastening member and the pressure-side flank surface of the counterpart fastening member and exerts the loosening-inhibition effect.

A second aspect is defined as follows. That is, in the fastening member according to the first aspect, the lower end of the pressure-side flank surface is farthest from a pressure-side flank surface of a reference thread profile in the pressure-side flank surface and protrudes in a pressure-side direction. The pressure-side direction is a direction of the side, on which the pressure-side flank surface of each of the multiple threads constituting the fastening member is formed.

In the fastening member according to the thus-defined second aspect, the lower end of the pressure-side flank surface first contacts the pressure-side flank surface of the counterpart fastening member when the fastening member is screwed to the counterpart fastening member. Accordingly, a force from the counterpart fastening member to the thread first acts on the lower end (i.e., connection between pressure-side flank surface and side surface). Therefore, the force efficiently induces the elastic deformation of the side surface having the specific shape.

Since the counterpart fastening member gradually contacts the lower side (root side) and then the upper side (top side) of the thread. Therefore, the plastic deformation of the top side can be surely inhibited.

A third aspect of the present invention is defined as follows. That is, in the fastening member according to the second aspect, the pressure-side flank surface is provided in the pressure-side direction from the pressure-side flank surface of the reference thread profile as a whole.

With the fastening member according to the third aspect, the above-mentioned action and effect of the second aspect can be obtained surely.

A fourth aspect of the present invention is defined as follows. That is, in the fastening member according to any one of the first to third aspects, the play-side flank surface coincides with a play-side flank surface of the reference thread profile.

Also with the fastening member according to the fourth aspect, the above-mentioned action and effect of the first to third aspects can be obtained.

A fifth aspect of the present invention is defined as follows. That is, in the fastening member according to the second or third aspect, the thread is inclined in the pressure-side direction from a pair of roots of the reference thread profile such that the thread top portion, the pressure-side flank surface and the play-side flank surface of the thread are positioned in the pressure-side direction from those of the reference thread profile respectively.

With the fastening member according to the thus-defined fifth aspect, the thread is inclined to the pressure side as a whole. Therefore, the thread exhibits higher resistance against the force, which is applied from the counterpart fastening member when the fastening member is screwed to the counterpart fastening member. As a result, a larger elastic force can be generated.

A sixth aspect of the present invention is defined as follows. That is, in the fastening member according to any one of the second to fifth aspects, a flank angle of the pressure-side flank surface is formed to be larger than a flank angle of the pressure-side flank surface of the reference thread profile, and a difference between the flank angles is 3 degrees or smaller.

If the difference between the flank angles of the pressure-side flank surfaces becomes larger than 3 degrees, there is a possibility that the lower end of the pressure-side flank surface (i.e., connection between pressure-side flank surface and pressure-side side surface) causes plastic deformation. In this case, there is a possibility that the force from the counterpart fastening member is absorbed in the lower end and the elastic deformation of the pressure-side side surface is not induced efficiently.

The lower limit of the difference between the both flank angles is not limited specifically but exceeds a general tolerance.

A seventh aspect of the present invention is defined as follows. That is, in the fastening member according to any one of first to sixth aspects, the lower end of the pressure-side flank surface is positioned in a range from one-third to two-thirds of height of a thread of a reference thread profile.

If the lower end of the pressure-side flank surface of the fastening member exceeds two-thirds of the height of the thread of the reference thread profile, a ratio of the lower portion in the thread is too large. Since the pressure-side side surface of the lower portion is recessed, there is a possibility that sufficient strength of the fastening member cannot be secured.

If the lower end of the pressure-side flank surface of the fastening member is lower than one-third of the height of the thread of the reference thread profile, it is not preferable because a sufficient curve line portion cannot be secured in the side surface of the lower portion of the thread and the elastic deformation of the portion becomes insufficient.

It is preferable that the lower end of the pressure-side flank surface of the fastening member is positioned on the pressure-side flank surface of the counterpart fastening member (i.e., pressure-side flank surface of counterpart fastening member overlaps pressure-side side surface of fastening member) in a fastened state.

Accordingly, the pressure-side flank surface and the connection between the pressure-side flank surface and the side surface that is continuous from the pressure-side flank surface surely contact the pressure-side flank surface of the counterpart fastening member. Thus, the elastic deformation of the pressure-side side surface is surely induced by the force from the counterpart fastening member.

An eighth aspect of the present invention is defined as follows. That is, in the fastening member according to any one of the first to seventh aspects, a shape of the pressure-side side surface is a shape provided by combining a straight line shape positioned inside the extended line of the pressure-side flank surface and a curve line shape that curves inward from the extended line, and the straight line shape is a straight line perpendicular to the axial line of the fastening member.

With the eighth aspect, the above-described action and effect of the first aspect can be surely obtained.

A ninth aspect of the present invention is defined as follows.

In the fastening member according to any one of the first to eighth aspects, the play-side side surface is formed as the same flat surface as the play-side flank surface.

In the fastening member according to the thus-defined ninth aspect, the play-side flank surface extends in the shape of the flat surface as it is and is continuous to the thread root. Therefore, the fastening member exhibits a large resistance against the force, which is applied from the counterpart fastening member when the fastening member is tightened to the counterpart fastening member. Accordingly, a large reaction force can be generated.

A tenth aspect of the present invention is defined as follows. That is, a fastening structure has the fastening member according to any one of the first to ninth aspects and a counterpart fastening member to be fastened to the fastening member. In the fastening structure, the pressure-side flank surface of the fastening member contacts the counterpart fastening member and the pressure-side side surface of the fastening member is distant from the counterpart fastening member when the fastening member is fastened to the counterpart fastening member.

With the fastening structure according to the tenth aspect, the above-described action and effect of the first to ninth aspects can be surely obtained.

An eleventh aspect of the present invention is defined as follows. That is, a fastening method for fastening the fastening member according to the second or third aspect to a counterpart fastening member to be fastened to the fastening member includes bringing the lower end of the pressure-side flank surface of the fastening member into contact with a pressure-side flank surface of the counterpart fastening member first when the fastening member is screwed to the counterpart fastening member.

According to the eleventh aspect, the above-described action and effect of the second or third aspect can be surely obtained.

BRIEF DESCRIPTION OF THE DRAWINGS

FIG. 8 is an enlarged cross-sectional view including an axial line 5 of a thread 400 according to a fourth embodiment of the present invention.

MODES FOR IMPLEMENTING THE INVENTION

Hereafter, embodiments of the present invention will be explained in detail with reference to the drawings. The same sign will be used for the identical construction member or element. Duplicative explanation of the same content is omitted.

First Embodiment

Figure 1:
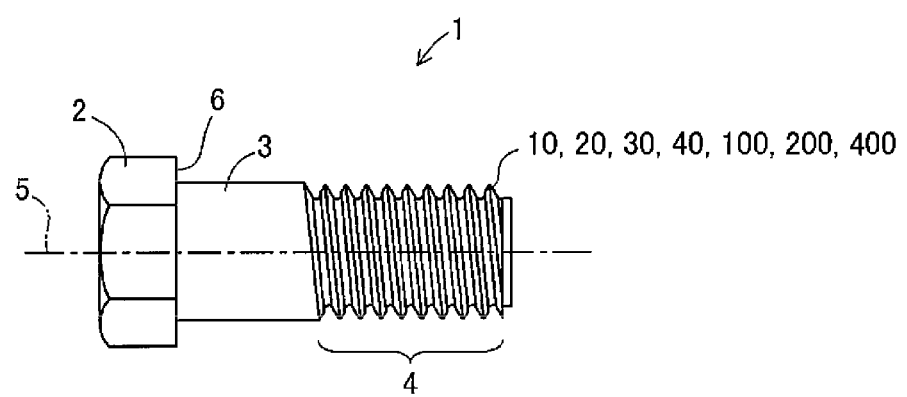
FIG. 1 is a front view showing a bolt 1 having a thread 10 in an unfastened state according to a first embodiment of the present invention.

FIG. 1 is a front view showing a bolt 1 having a thread 10, 20, 30, 40, 100, 200, 400 of each of the embodiments in an unfastened state.

The bolt 1 as a fastening member has an external thread structure and has a head portion 2, a cylinder portion 3, a screw portion 4 and an axial line 5. A seat surface 6 is formed on a surface of the head portion 2 on the cylinder portion 3 side. The thread 10 is formed on the screw portion 4.

Figure 2A:
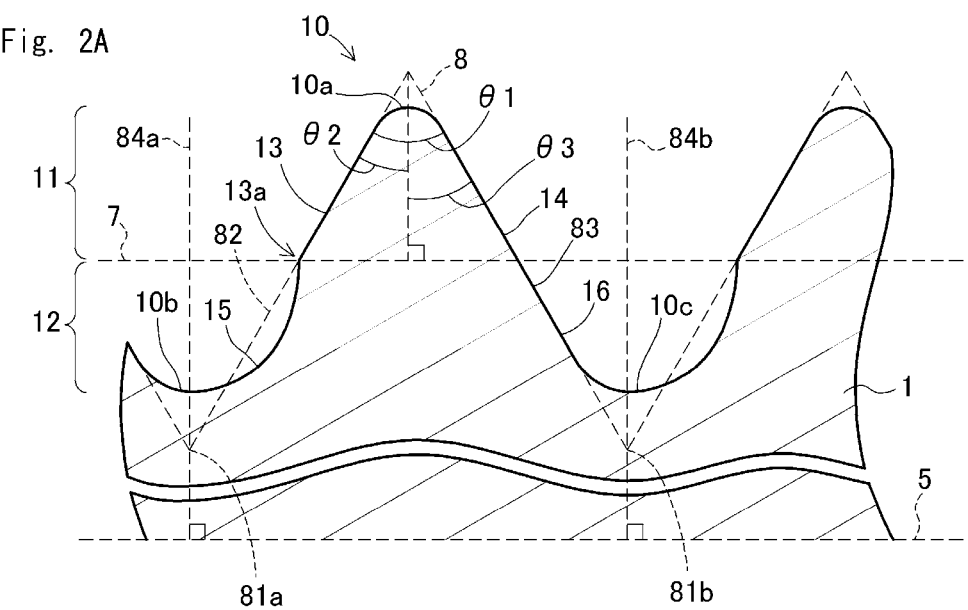
FIG. 2(A) is an enlarged cross-sectional view including an axial line 5 of the thread 10 shown in FIG. 1.

FIG. 2(A) is an enlarged cross-sectional view showing the thread 10 including the axial line 5 shown in FIG. 1.

A virtual cylinder 7 is a virtual cylinder defining an effective diameter of a reference thread profile 8.

In other words, the effective diameter is a diameter of the virtual cylinder 7 that equalizes width of a thread groove and width of the thread measured along the direction of the axial line 5 of the reference thread profile 8.

The reference thread profile 8 has external thread roots 81a, 81b, a pressure-side flank surface 82 and a play-side flank surface 83.

The axial line of the reference thread profile 8 is the same as the axial line 5 of the thread 10.

The reference thread profile 8 is a theoretical thread profile defined by JIS (Japanese Industrial Standards). In this example, an angle θ1 of the thread of the reference thread profile 8 is approximately 60 degrees. Both of a flank angle θ2 of the pressure-side flank surface 82 and a flank angle θ3 of the play-side flank surface 83 are approximately 30 degrees.

Virtual lines 84a, 84b run across the external thread roots 81a, 81b of the reference thread profile 8 and cross the axial line 5 perpendicularly respectively.

A pitch of the reference thread profile 8 is a distance between the external thread roots 81a, 81b measured parallel to the axial line 5.

The thread 10 according to the first embodiment has an upper portion 11 on an external thread top portion 10a side of the virtual cylinder 7 and a lower portion 12 on an external thread roots 10b, 10c side of the virtual cylinder 7.

A pressure-side flank surface 13 and a play-side flank surface 14 are formed on the upper portion 11 of the thread 10.

The flank angle θ2 of the pressure-side flank surface 13 of the thread 10 is substantially equal to the flank angle of the pressure-side flank surface 82 of the reference thread profile 8 and is approximately 30 degrees.

The flank angle θ3 of the play-side flank surface 14 of the thread 10 is substantially equal to the flank angle of the play-side flank surface 83 of the reference thread profile 8 and is approximately 30 degrees.

Therefore, the angle θ1 of the thread 10 is substantially equal to the angle of the reference thread profile 8 and is approximately 60 degrees.

A pitch of the thread 10 is the same as the pitch of the reference thread profile 8.

A side surface 15 on a pressure side (seat surface 6 side (refer to FIG. 1)) and a side surface 16 on a play side (screw tip end side) are formed on the lower portion 12 of the thread 10.

The shape of the pressure-side side surface 15 in the cross-section including the axial line 5 is a rounded shape that curves inward from an extended line of the pressure-side flank surface 13 (i.e., line extending along pressure-side flank surface 82 of reference thread profile 8) and that is continuous to the external thread root 10b. In other words, the shape is a shape recessed from an extended surface of the pressure-side flank surface.

The pressure-side side surface 15 is continuous to a play-side side surface of a thread (not shown), which exists adjacently on the pressure side (seat surface 6 side) from the external thread root 10b.

The shape of the play-side side surface 16 in the cross section including the axial line 5 is the same flat surface as the play-side flank surface 14 such that the play-side flank surface 14 extends in the flat surface shape as it is and is continuous to the external thread root 10c.

The play-side side surface 16 is continuous to the pressure-side side surface of the thread, which exists adjacently on the play side (screw tip end side) from the external thread root 10c.

In the thread 10, a lower end 13a of the pressure-side flank surface 13 (i.e., upper end of pressure-side side surface 15) is formed at a position close to the virtual cylinder 7 (i.e., position close to effective diameter of reference thread profile 8).

Figure 2B:
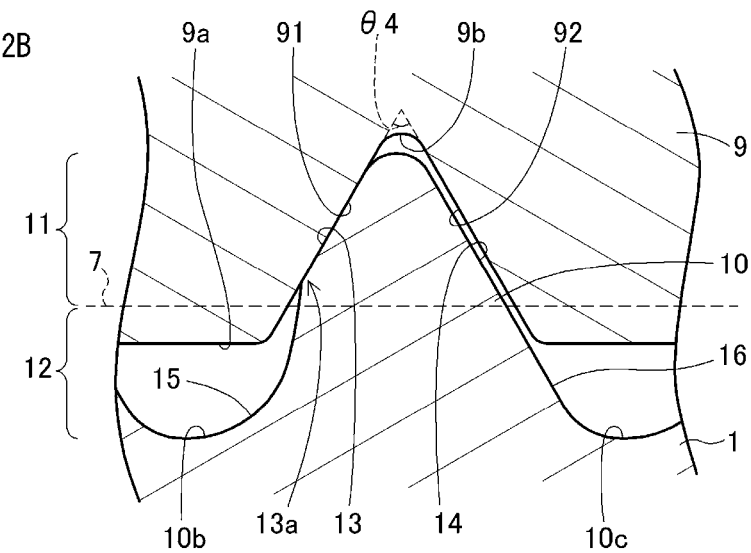
FIG. 2(B) is a cross-sectional view showing the thread 10 in a state where a nut 9 as a counterpart fastening member is fastened to the bolt 1 according to the first embodiment.

FIG. 2(B) is a cross-sectional view showing the thread 10 in a state where a nut 9 as a counterpart fastening member is fastened to the bolt 1 according to the first embodiment.

The nut 9 has an internal thread structure and has a pressure-side flank surface 91, a play-side flank surface 92, an internal thread top portion 9a and an internal thread root 9b.

The nut 9 has a shape compliant with JIS. An angle θ4 of the internal thread root 9b is approximately 60 degrees, and both of a flank angle of the pressure-side flank surface 91 and a flank angle of the play-side flank surface 92 are approximately 30 degrees.

The manufacturing method of the bolt 1 is not limited specifically but any manufacturing method may be employed. For example, various rolling processes (e.g., flat die type, circular die type, planetary die type, rotary die type), a cutting process, a casting process, a forging process, mold injection or the like may be used.

A side surface of the lower portion 12 (recessed portion) should be preferably formed over the entire range of the screw portion 4 of the bolt 1. Alternatively, the side surface of the lower portion 12 may be formed only in the portion to be screwed with the nut.

The side surface shape of the lower portion may be varied among the respective threads. For example, a recessed amount of the pressure-side side surface of the lower portion of the thread is enlarged more as a distance from the seat surface increases. More specifically, a curvature radius defining the side surface 15 is increased in series as the distance from the seat surface increases.

From a similar standpoint, the lower end position of the pressure-side flank surface can be varied arbitrarily among the respective threads. For example, the lower end position of the first thread is set closest to the root, and the lower end position is shifted toward the top portion side more as a distance to the tip end of the bolt decreases.

As shown in FIG. 2(B), if the thread 10 of the bolt 1 is screwed to the nut 9, the pressure-side flank surface 91 of the nut 9 presses the pressure-side flank surface 13 of the thread 10.

The pressure-side side surface 15 of the lower portion 12 of the thread 10 has the cross-section in the shape of the curve line that curves inward from the extended surface of the pressure-side flank surface 82 and that is continuous to the thread root 10b. Therefore, when the thread is caused to deform toward the bolt tip end side (right side in illustration) by the force from the nut 9, large part of the deformation of the thread concentrates on the pressure-side side surface 15 and causes elastic deformation of the pressure-side side surface 15. The elastic deformation provides a strong reaction force and applies a large frictional force between the flank surfaces 13, 91.

Figure 3:
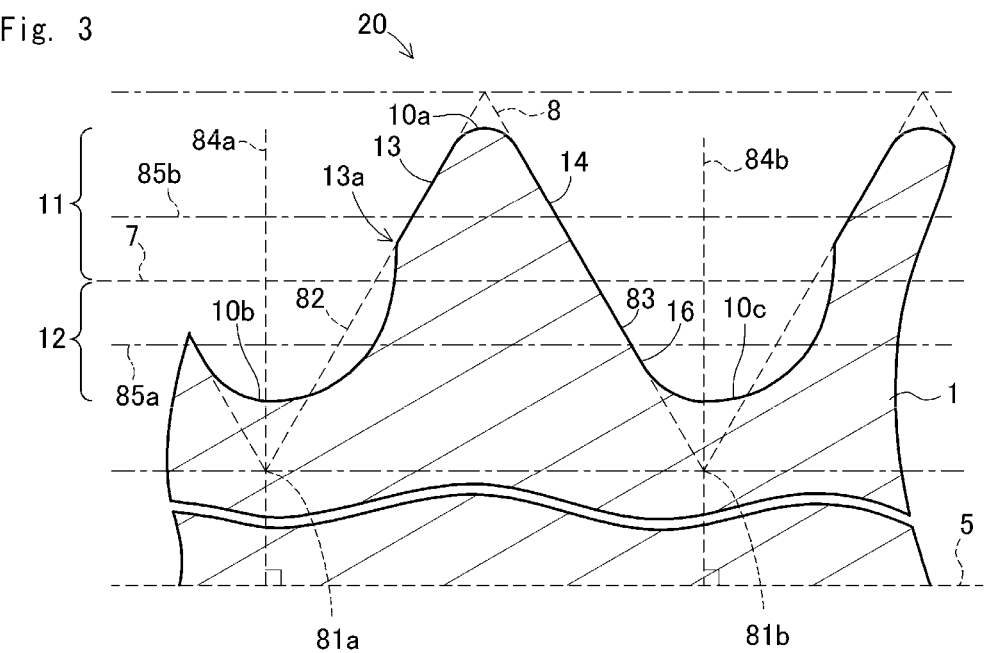
FIG. 3 is an enlarged cross-sectional view including an axial line 5 of a thread 20 of a first modification of the first embodiment.
Figure 4:
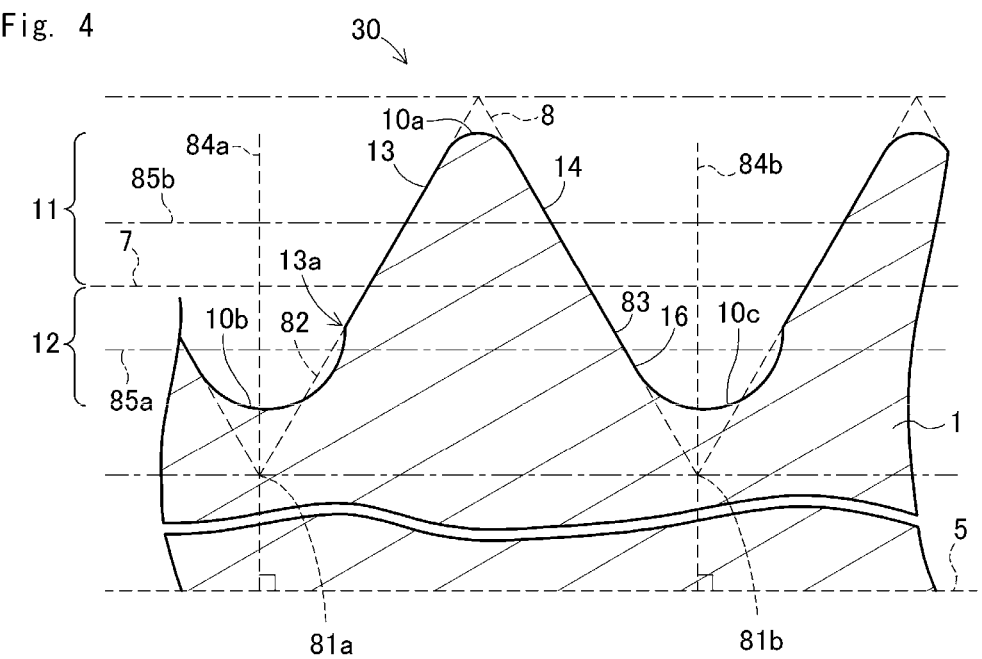
FIG. 4 is an enlarged cross-sectional view including an axial line 5 of a thread 30 of a second modification of the first embodiment.

Modifications of the first embodiment are shown in FIGS. 3 and 4. The same sign is used for the same element in FIGS. 3 and 4 and explanation thereof is omitted.

In the first modification (thread 20) shown in FIG. 3, the lower end 13a of the pressure-side flank surface 13 (i.e., upper end of pressure-side side surface 15) is formed at a position on the external thread top portion 10a side of the virtual cylinder 7 (i.e., position outside effective diameter of reference thread profile 8).

In a second modification shown in FIG. 4 (thread 30), the lower end 13a of the pressure-side flank surface 13 (i.e., upper end of pressure-side side surface 15) is formed at a position on the external thread roots 10b, 10c side of the virtual cylinder 7 (i.e., position inside effective diameter of reference thread profile 8).

The fastening members of these modifications also exert effects similar to those of the fastening member shown in FIG. 2.

Figure 5:
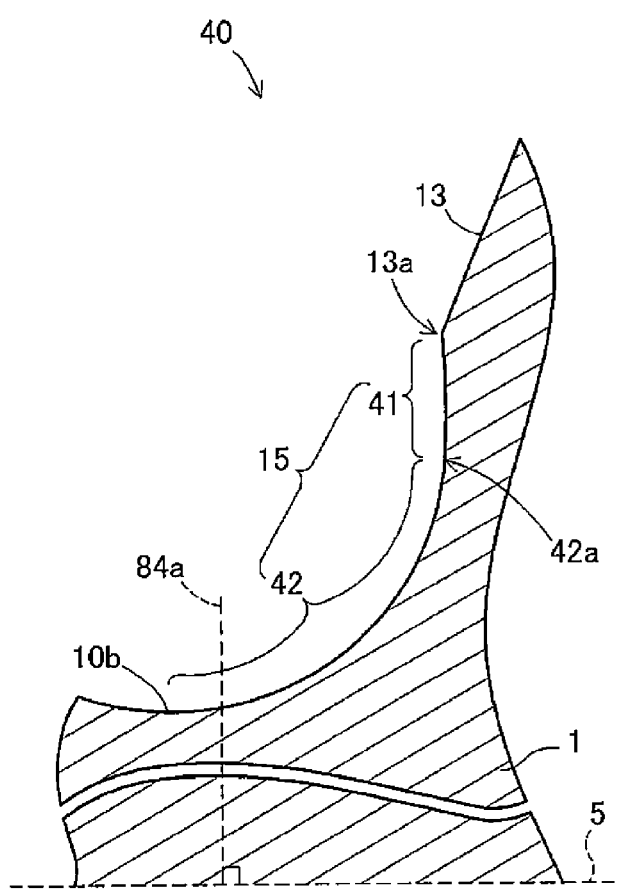
FIG. 5 is an enlarged cross-sectional view showing a pressure-side side surface 15 of a thread 40 of a third modification of the first embodiment.

FIG. 5 is an enlarged cross-sectional view of a pressure-side side surface 15 of a thread 40 of a third modification. The same elements in FIG. 5 as those in FIG. 2 are denoted with the same signs and explanation thereof is omitted.

In the thread 40 of the third modification, the shape of the pressure-side side surface 15 in the cross-section including the axial line 5 is provided by combining a straight line 41 positioned inside an extended line of the pressure-side flank surface 13 (i.e., line extending along pressure-side flank surface 82 of reference thread profile 8) and a curve line 42 curving inward from the extended line.

The straight line 41 is perpendicular to the axial direction of the bolt 1 (refer to FIG. 2), i.e., parallel to the virtual line 84a. An upper end of the straight line 41 is connected to the lower end 13a of the pressure-side flank surface 13.

An upper end 42a of the curve line 42 is connected to the lower end of the straight line 41. A lower end of the curve line 42 is formed in a rounded shape continuous to the thread root 10b.

With the thread 40 constructed in this way, a loosening-inhibition effect improves in addition to the loosening-inhibition effect as in the example of FIG. 2.

The upper end of the straight line 41 (i.e., lower end 13a of pressure-side flank surface 13) should be preferably positioned on the external thread top portion 10a side of the virtual cylinder 7 (i.e., outside effective diameter of reference thread profile 8) like the first modification (refer to FIG. 3).

As the upper end of the straight line 41 is moved to the position closer to the external thread top portion 10a than the virtual cylinder 7, the thread 40 becomes more deformable.

Instead of setting the straight line 41 to be perpendicular to the axial direction of the bolt 1 (refer to FIG. 2) (i.e., parallel to virtual line 84a), the straight line 41 may be inclined in the pressure-side direction or the play-side direction.

The pressure-side direction is a direction of a side, on which the pressure-side flank surface 13 of each of the threads 40 constituting the bolt 1 is provided.

The play-side direction is a direction of a side, on which the play-side flank surface 14 (not shown in FIG. 5) (refer to FIG. 2) of each of the threads 40 constituting the bolt 1 is provided.

When the shape of the pressure-side side surface 15 in the cross-section including the axial line 5 of the thread 10 of FIG. 2 is formed as the curve line that curves inward from the extended line of the pressure-side flank surface 13, the shape of the curve line is not limited to a rounded shape having a constant curvature radius but may be a combined rounded shape provided by combining multiple curved surfaces having different curvature radii.

In the thread 40 shown in FIG. 5, the curve line 42 is not limited to the rounded shape but may be a combined rounded shape.

Second Embodiment

Figure 6A:
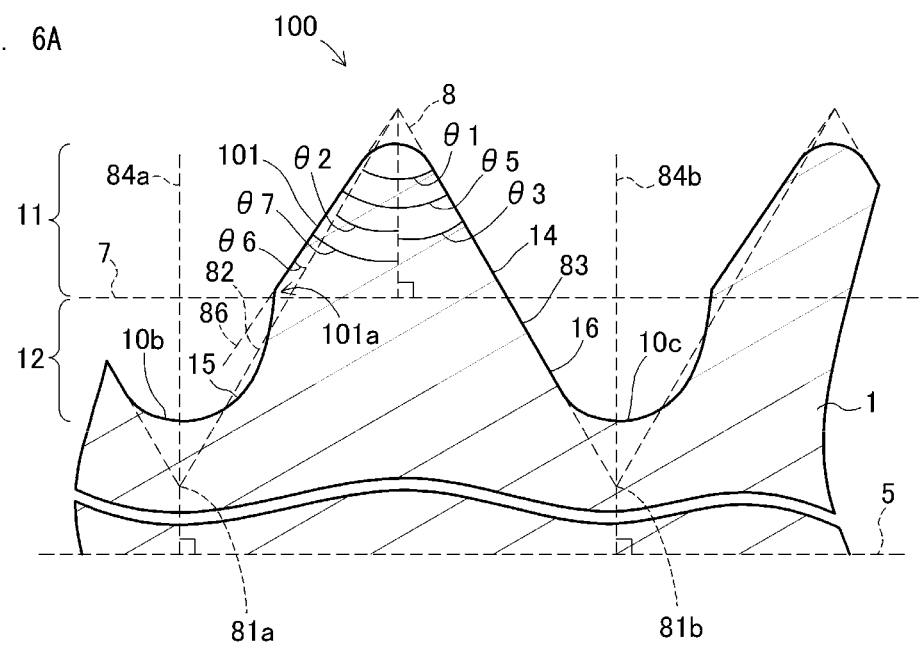
FIG. 6(A) is an enlarged cross-sectional view including an axial line 5 of a thread 100 according to a second embodiment of the present invention.

FIG. 6(A) is an enlarged cross-sectional view including an axial line 5 of a thread 100 of a second embodiment.

Figure 6B:
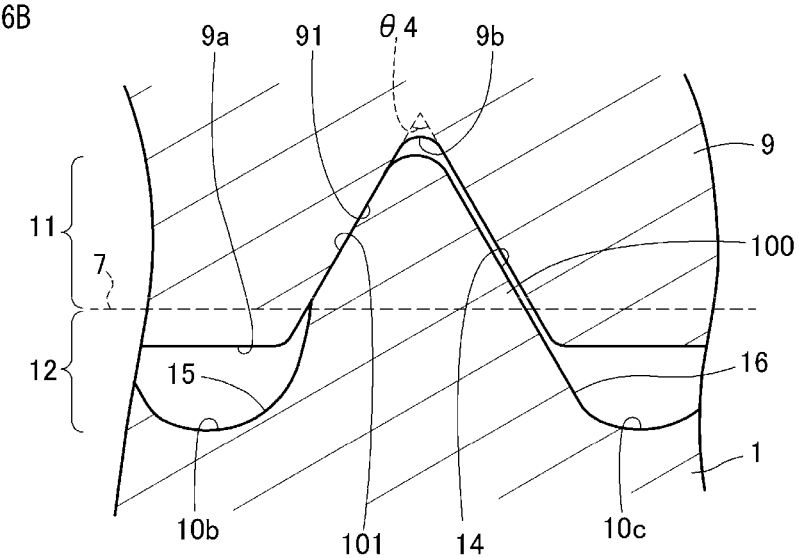
FIG. 6(B) is a cross-sectional view showing the thread 100 in a state where the nut 9 is fastened to a bolt 1 according to the second embodiment.

FIG. 6(B) is a cross-sectional view showing the thread 100 in a state where the nut 9 is screwed to the bolt 1 of the second embodiment.

The same elements in FIG. 6 as those in FIG. 2 are denoted with the same signs as FIG. 2 and explanation thereof is omitted.

In the thread 100 shown in FIG. 6, an angle $\theta 5$ of the thread 100 is larger than the angle $\theta 1$ of the thread of the reference thread profile 8. The flank angle $\theta 3$ of the play-side flank surface 14 is substantially the same as the flank angle of the play-side flank surface 83 of the reference thread profile 8 and is approximately 30 degrees.

A pressure-side flank surface 101 of the thread 100 is formed along a virtual line 86, which is provided by adding an angle $\theta 6$ (=3 degrees or smaller) to the flank angle $\theta 2$ (=approximately 30 degrees) of the pressure-side flank surface 82 of the reference thread profile 8. A flank angle θ7 (=θ2+θ6) of the pressure-side flank surface 101 is approximately 30 degrees to 33 degrees.

The angle θ5 (=θ1+θ6) of the thread 100 is approximately 60 to 63 degrees.

In the thread 100 of the second embodiment constructed in this way, a lower end 101a of the pressure-side flank surface 101 is farthest from the pressure-side flank surface 82 of the reference thread profile 8 in the pressure-side flank surface 101 and protrudes in the pressure-side direction.

The pressure-side flank surface 101 of the thread 100 is formed in the pressure-side direction from the pressure-side flank surface 82 of the reference thread profile 8 as a whole.

The pressure-side direction is a direction of a side, on which the pressure-side flank surface 101 of each of the threads 100 constituting the bolt 1 is provided.

In the thread 100 of FIG. 6 constructed in this way, the lower end 101a of the pressure-side flank surface 101 of the thread 100 contacts the pressure-side flank surface 91 of the nut 9 first when the bolt 1 is tightened to the nut 9.

As a result, a force from the nut 9 induces elastic deformation of the side surface 15 through the lower end 101a. Moreover, this precludes concentration of a repulsive force from the nut 9 on the thread top side of the upper portion 11.

In order to surely obtain such the action and effect, the angle θ6 should be preferably set in a range equal to or smaller than 3 degrees.

If the angle θ6 exceeds 3 degrees, there is a possibility that plastic deformation of the lower end of the pressure-side flank surface is caused by the force from the nut 9 when the lower end contacts the nut 9 first. If the lower end causes the plastic deformation, the inducement of the elastic deformation of the pressure-side side surface 15 by the force from the nut 9 is reduced unfavorably.

Third Embodiment

Figure 7A:
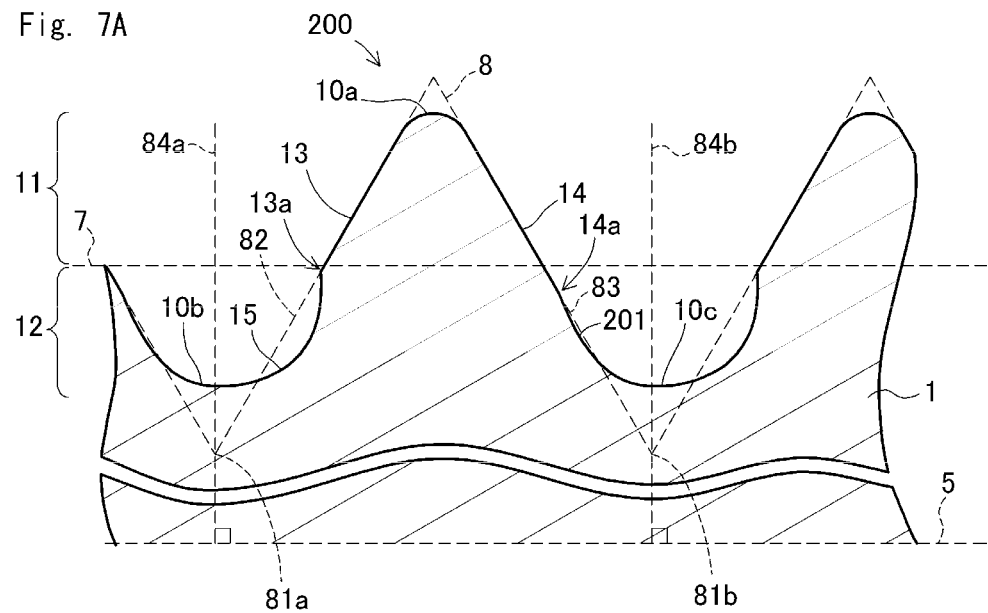
FIG. 7(A) is an enlarged cross-sectional view including an axial line 5 of a thread 200 according to a third embodiment of the present invention.

FIG. 7(A) is an enlarged cross-sectional view including an axial line 5 of a thread 200 according to a third embodiment.

Figure 7B:
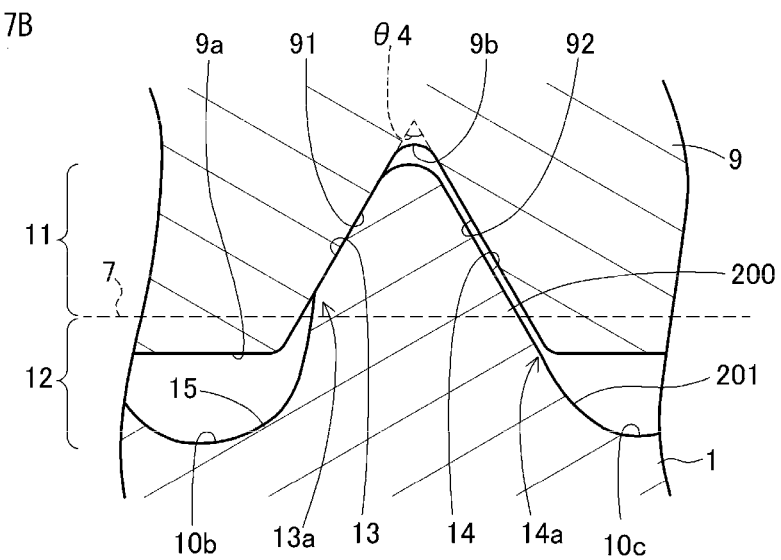
FIG. 7(B) is cross-sectional view showing the thread 200 in a state where the nut 9 is fastened to a bolt 1 according to the third embodiment.

FIG. 7(B) is a cross-sectional view showing the thread 200 in a state where the nut 9 is screwed to the bolt 1 of the third embodiment.

The same elements in FIG. 7 as those in FIG. 2 are denoted with the same signs as FIG. 2 and explanation thereof is omitted. A shape of a play-side side surface 201 of the thread 200 of FIG. 7 in the cross-section including the axial line 5 is a rounded shape that curves inward from an extended line of the play-side flank surface 14 (i.e., line extending along play-side flank surface 83 of reference thread profile 8) and that is continuous to the external thread root 10c.

The play-side side surface 201 is continuous to the pressure-side side surface of the thread, which exists adjacently on the play side (i.e., screw tip end side) from the external thread root 10c.

The lower portion 12 of the thread 200 shown in FIG. 7 is thinner than that of FIG. 2. As a result, the former one is more apt to cause the elastic deformation than the latter one. That is, it is preferable to examine the use and the material of the bolt and to employ the structure shown in FIG. 7 in accordance with required tightening torque when necessary.

The position of the lower end 14a of the play-side flank surface 14 of the thread 200 (i.e., upper end of play-side side surface 201) should be preferably positioned below (i.e., on root side of) the position of the lower end 13a of the pressure-side flank surface 13 (i.e., upper end of pressure-side side surface 15).

If the rounded shape of the play-side side surface is made large (i.e., if position of lower end 14a of play-side flank surface is raised), the lower portion of the thread becomes thin because of both of the rounded shapes of the play-side side surface and the pressure-side side surface. As a result, there is a possibility that the entire thread causes the plastic deformation.

Fourth Embodiment

FIG. 8 is an enlarged cross-sectional view including an axial line 5 of a thread 400 according to a fourth embodiment.

Figure 9:
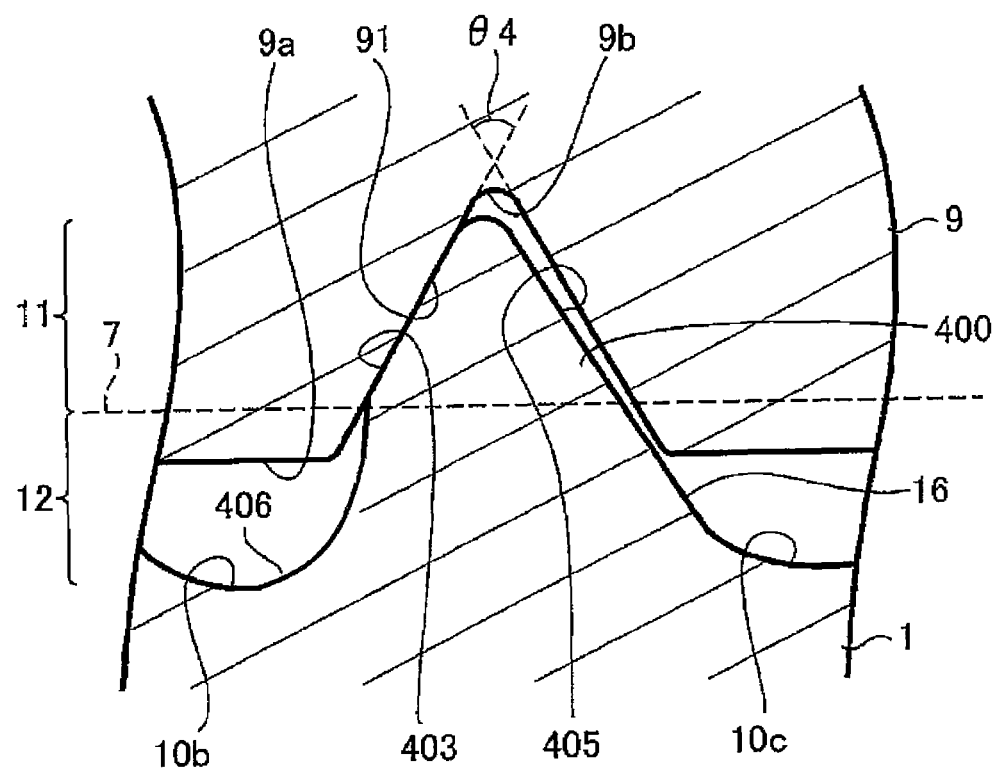
FIG. 9 is a cross-sectional view showing the thread 400 in a state where the nut 9 is fastened to a bolt 1 according to the fourth embodiment.

FIG. 9 is a cross-sectional view showing the thread 400 in a state where the nut 9 is tightened to the bolt 1 according to the fourth embodiment.

The same elements in FIGS. 8 and 9 as those in FIG. 2 are denoted with the same signs as FIG. 2 and explanation thereof is omitted.

In FIG. 8, a virtual line 401 crosses the external thread root 81a of the reference thread profile 8. An angle θ8 between the virtual line 84a, which crosses the external thread root 81a and which is perpendicular to the axial line 5, and the virtual line 401 is approximately 27 degrees.

A virtual line 402 crosses the external thread root 81b of the reference thread profile 8. An angle θ9 between the virtual line 84b, which crosses the external thread root 81b and which is perpendicular to the axial line 5, and the virtual line 402 is approximately 33 degrees.

A pressure-side flank surface 403 of the thread 400 is formed along a virtual line 404, which is provided by adding an angle θ10 (=3.5 to 6 degrees) to the angle θ8 of the virtual line 401. A flank angle θ11 (=θ8+θ10) of the pressure-side flank surface 403 is 30.5 to 33 degrees.

A play-side flank surface 405 of the thread 400 is formed along the virtual line 402. A flank angle θ9 of the play-side flank surface 405 is the same as the angle θ9 of the virtual line 402.

Therefore, an angle θ12 (=θ9+θ11) of the thread of the upper portion 11 of the thread 400 is approximately 63.5 to 66 degrees.

A shape of the pressure-side side surface 406 of the thread 400 in the cross-section including the axial line 5 is provided by combining a straight line 407 positioned inside the virtual line 404, which is the extended line of the pressure-side flank surface 403, and a curve line 408, which curves inward from the virtual line 404.

That is, the shape of the pressure-side side surface 406 is similar to the shape of the pressure-side side surface 15 of the thread 40 of the third modification of the first embodiment (refer to FIG. 5).

A shape of a play-side side surface 16 of the thread 400 in the cross-section including the axial line 5 is the same flat surface as the play-side flank surface 405 such that the play-side flank surface 405 extends in the flat shape as it is and is continuous to the external thread root 10c.

In the thread 400 of the fourth embodiment constructed in this way, a lower end 403a of the pressure-side flank surface 403 is farthest from the pressure-side flank surface 82 of the reference thread profile 8 in the pressure-side flank surface 403 and protrudes in the pressure-side direction. Therefore, effects similar to those of the second embodiment shown in FIG. 6 can be obtained.

That is, when the bolt 1 is screwed to the nut 9, the lower end 403a of the pressure-side flank surface 403 of the thread 400 contacts the pressure-side flank surface 91 of the nut 9 first.

As a result, the force from the nut 9 is efficiently transmitted into elastic deformation in a direction for widening and opening the side surface 406 through the lower end 403a. The elastic deformation of the side surface 406 generates a large repulsive force and gives a large frictional force between the pressure-side flank surfaces 403, 91. The lower end 403a is preferentially brought into contact with the pressure-side flank surface 91 of the nut 9. Accordingly, the force from the nut 9 can be prevented from concentrating on the thin thread top side of the upper portion 11.

Since the thread 400 of this example is inclined toward the pressure side, the thread 400 has a high resistance against the force from the nut 9. Therefore, the thread 400 is less apt to cause elastic deformation as a whole as compared to the example of FIG. 7. As a result, the force from the nut 9 is easily converted into the elastic deformation of the pressure-side side surface 406.

In the example of FIG. 8, an angle ($\theta 11-\theta 2$) provided by subtracting the flank angle $\theta 2$ of the pressure-side flank surface 82 of the reference thread profile 8 from the flank angle $\theta 11$ of the pressure-side flank surface 403 should be preferably set in a range equal to or smaller than 3 degrees.

That is, the above subtracted angle ($\theta 11-\theta 2$) of the fourth embodiment is equivalent to the angle $\theta 6$ of the second embodiment. The explanation about the range of the angle $\theta 6$ of the second embodiment also applies to the range of the angle ($\theta 11-\theta 2$) as it is.

In order to confirm the loosening-inhibition effect of the bolt according to the present embodiment, a vibration test was performed.

The vibration test is the standard vibration test of Japan Quality Assurance Organization Kansai Test Center and was performed as follows.

A sample is attached to a high-speed screw loosening test machine. The test is performed on predetermined vibration conditions (frequency: 1780 Hz, vibrator table stroke: 11 mm, impact stroke: 19 mm, vibration direction: direction perpendicular to bolt axis). When the sample is attached to the high-speed screw loosening test machine, a vibration barrel and a washer are held between the bolt and a nut, and the vibration barrel is vibrated by the vibrator table.

The sample is a hexagon bolt of M12×60. A hexagon nut is screwed to the bolt with tightening torque of 80 N·m.

Each of working examples 1-1, 1-2 has the structure shown in FIG. 8. Comparative examples 1-1, 1-2 are JIS products, whose thread profiles are the same as the reference thread profile. The respective examples are plated with trivalent chromium. The result is shown in Table 1.

It is determined that the bolt is loosened when match marks of the bolt, the nut and the washer deviate from each other and the washer can be rotated by hand.

A working example 1-3 is a result obtained by removing the nut from the bolt of the sample of the working example 1-2 once and then screwing the nut on the same conditions again and performing the vibration test.

TABLE 1

| | Material | Result |
|---|---|---|
| Working example 1-1 | Carbon steel 4.8T | Did not loosen for 10 minutes. |
| Working example 1-2 | Carbon steel 8.8T | Did not loosen for 10 minutes. |
| Working example 1-3 | Carbon steel 8.8T | Did not loosen for 10 minutes. |
| Comparative example 1-1 | Carbon steel 4.8T | Loosened in 16 seconds. |
| Comparative example 1-2 | Carbon steel 8.8T | Loosened in 64 seconds. |

Other Embodiments (A) The above embodiments may be combined arbitrarily with each other and implemented. In this case, the actions and effects of the combined embodiments are obtained altogether and also a synergetic effect can be obtained.

(B) In the above embodiments, the present invention is applied to the reference thread profile 8 defined by JIS and the nut 9 compliant with JIS. Alternatively, the present invention may be applied to any publicly-known standards (e.g., unified screw thread or Whitworth screw thread).

(C) In the above embodiments, the present invention is applied to the bolt of the right screw. Alternatively, the present invention can be also applied to a bolt of a left screw. Also when the present invention is applied to the bolt of the left screw, the same actions and effects as the case where the present invention is applied to the bolt of the right screw can be obtained.

(D) In the above embodiments, the present invention is applied to the fastening member having the external thread structure. The present invention can be also applied to a fastening member having an internal thread structure. Also when the present invention is applied to the fastening member having the internal thread structure, the same actions and effects as the case where the present invention is applied to the fastening member having the external thread structure can be obtained.

(E) In the above embodiments, the present invention is applied to the bolt 1 having the head portion 2 formed with the seat surface 6. The present invention can be also applied to a screw having no head portion (e.g., setscrew).

The present invention is not limited to the explanation of the above-described aspects and embodiments. Various modifications that can be easily and conceptually reached by a person skilled in the art without departing from the description of the scope of claims are also included in the present invention. All the contents of the literatures, the laid-open patent publications, the patent gazettes and the like indicated in the specification are incorporated herein by reference.

DESCRIPTION OF THE REFERENCE NUMERALS

1 Bolt (fastening member)
10, 20, 30, 40, 100, 200, 400 Thread
10a 100a, 400a External thread top portion
10b, 10c External thread root
11 Upper portion
12 Lower portion
13, 101, 403 Pressure-side flank surface
13a, 101a Lower end of pressure-side flank surface 13
14, 405 Play-side flank surface
14a Lower end of play-side flank surface 14
15, 406 Pressure-side side surface
16, 201, 301 Play-side side surface
41, 407 Straight line
42, 408 Curve line
5 Axial line
7 Virtual cylinder
8 Reference thread profile
82 Pressure-side flank surface of reference thread profile 8
83 Play-side flank surface of reference thread profile 8
9 Nut (counterpart fastening member)
91 Pressure-side flank surface of nut 9
92 Play-side flank surface of nut 9
9a Internal thread top portion of nut 9
9b Internal thread root of nut 9

What is claimed is:

1. A fastening member having an upper portion on a thread top portion side and a lower portion on a thread root side in at least a part of a thread, the upper portion and the lower portion having following constructions, wherein
- a pressure-side flank surface and a play-side flank surface are formed on the upper portion,
- a pressure-side side surface and a play-side side surface are formed on the lower portion, the pressure-side side surface is formed to be continuous from a lower end of the pressure-side flank surface,
- a shape of the pressure-side side surface in a cross-section including an axial line of the fastening member is a curve line shape that curves inward from an extended line of the pressure-side flank surface or a shape provided by combining a straight line shape positioned inside the extended line of the pressure-side flank surface and a curve line shape that curves inward from the extended line, and
- the lower end of the pressure-side flank surface is farthest from a pressure-side flank surface of a reference thread profile in the pressure-side flank surface and protrudes in a pressure-side direction.

2. The fastening member as in claim 1, wherein
the pressure-side flank surface is provided in the pressure-side direction from the pressure-side flank surface of the reference thread profile as a whole.

3. The fastening member as in claim 1, wherein
the play-side flank surface coincides with a play-side flank surface of a reference thread profile.

4. The fastening member as in claim 1, wherein
the thread is inclined in the pressure-side direction from a pair of roots of the reference thread profile such that the thread top portion, the pressure-side flank surface and the play-side flank surface of the thread are positioned in the pressure-side direction from those of the reference thread profile respectively.

5. The fastening member as in claim 1, wherein
a flank angle of the pressure-side flank surface is formed to be larger than a flank angle of the pressure-side flank surface of the reference thread profile, and
a difference between the flank angles is 3 degrees or smaller.

6. The fastening member as in claim 1, wherein
the lower end of the pressure-side flank surface is positioned in a range from one-third to two-thirds of height of a thread of a reference thread profile.

7. The fastening member as in claim 1, wherein
a shape of the pressure-side side surface is a shape provided by combining a straight line shape positioned inside the extended line of the pressure-side flank surface and a curve line shape that curves inward from the extended line, and
the straight line shape is a straight line perpendicular to the axial line of the fastening member.

8. The fastening member as in claim 1, wherein
the play-side side surface is formed as the same flat surface as the play-side flank surface.

9. A fastening structure comprising:
the fastening member as in claim 1; and
a counterpart fastening member to be fastened to the fastening member, wherein
the pressure-side flank surface of the fastening member contacts the counterpart fastening member and the pressure-side side surface of the fastening member is distant from the counterpart fastening member when the fastening member is fastened to the counterpart fastening member.

10. A fastening method for fastening the fastening, member as in claim 1 and a counterpart fastening member to be fastened to the fastening member, the fastening method comprising:
bringing the lower end of the pressure-side flank surface of the fastening member into contact with a pressure-side flank surface of the counterpart fastening member first when the fastening member is screwed to the counterpart fastening member.

11. A fastening member having an upper portion on a thread top portion side and a lower portion on a thread root side in at least a part of a thread, the upper portion and the lower portion having following constructions, wherein
- a pressure-side flank surface and a play-side flank surface are formed on the upper portion,
- a pressure-side side surface and a play-side side surface are formed on the lower portion,
- the pressure-side side surface is formed to be continuous from a lower end of the pressure-side flank surface,
- a shape of the pressure-side side surface in a cross-section including an axial line of the fastening member is a curve line shape that curves inward from an extended line of the pressure-side flank surface or a shape provided by combining a straight line shape positioned inside the extended line of the pressure-side flank surface and a curve line shape that curves inward from the extended line, and
- a shape of the play-side side surface in the cross-section including the axial line of the fastening member extends along or outward from an extended line of the play-side flank surface.

12. The fastening member as in claim 11, wherein
the pressure-side flank surface is provided in the pressure-side direction from the pressure-side flank surface of the reference thread profile as a whole.

13. The fastening member as in claim 11, wherein
the play-side flank surface coincides with a play-side flank surface of a reference thread profile.

14. The fastening member as in claim 11, wherein
the thread is inclined in the pressure-side direction from a pair of roots of the reference thread profile such that the thread top portion, the pressure-side flank surface and the play-side flank surface of the thread are positioned in the pressure-side direction from those of the reference thread profile respectively.

15. The fastening member as in claim 11, wherein
a flank angle of the pressure-side flank surface is formed to be larger than a flank angle of the pressure-side flank surface of the reference thread profile, and
a difference between the flank angles is 3 degrees or smaller.

16. The fastening member as in claim 11, wherein
the lower end of the pressure-side flank surface is positioned in a range from one-third to two-thirds of height of a thread of a reference thread profile.

17. The fastening member as in claim 11, wherein
a shape of the pressure-side side surface is a shape provided by combining a straight line shape positioned inside the extended line of the pressure-side flank surface and a curve line shape that curves inward from the extended line, and
the straight line shape is a straight line perpendicular to the axial line of the fastening member.

18. The fastening member as in claim 11, wherein
the play-side side surface is formed as the same flat surface as the play-side flank surface.

19. A fastening structure comprising:
the fastening member as in claim 11; and
a counterpart fastening member to be fastened to the fastening member, wherein
the pressure-side flank surface of the fastening member contacts the counterpart fastening member and the pressure-side side surface of the fastening member is distant from the counterpart fastening member when the fastening member is fastened to the counterpart fastening member.

20. A fastening method for fastening the fastening member as in claim 11 and a counterpart fastening member to be fastened to the fastening member, the fastening method comprising:
bringing the lower end of the pressure-side flank surface of the fastening member into contact with a pressure-side flank surface of the counterpart fastening member first when the fastening member is screwed to the counterpart fastening member.

\* \* \* \* \*